US009496604B2

(12) United States Patent
Robert et al.

(10) Patent No.: US 9,496,604 B2
(45) Date of Patent: Nov. 15, 2016

(54) DEVICE FOR RECEIVING OR EMITTING/RECEIVING MIMO SIGNALS

(75) Inventors: Jean-Luc Robert, Betton (FR); Ali Louzir, Rennes (FR); Dominique Lo Hine Tong, Rennes (FR); Jean-Yves Le Naour, Pace (FR)

(73) Assignee: Thomson Licensing, Issy-les-Moulineaux (FR)

( * ) Notice: Subject to any disclaimer, the term of this patent is extended or adjusted under 35 U.S.C. 154(b) by 226 days.

(21) Appl. No.: 13/991,191

(22) PCT Filed: Dec. 7, 2011

(86) PCT No.: PCT/FR2011/052894
§ 371 (c)(1),
(2), (4) Date: Jun. 3, 2013

(87) PCT Pub. No.: WO2012/076813
PCT Pub. Date: Jun. 14, 2012

(65) Prior Publication Data
US 2013/0249770 A1 Sep. 26, 2013

(30) Foreign Application Priority Data
Dec. 8, 2010 (FR) .................................... 10 60241

(51) Int. Cl.
*H01Q 3/24* (2006.01)
*H01Q 1/50* (2006.01)
(Continued)

(52) U.S. Cl.
CPC .............. *H01Q 1/50* (2013.01); *H04B 7/0408* (2013.01); *H04B 7/0822* (2013.01)

(58) Field of Classification Search
CPC .... H04B 7/0408; H04B 7/0822; H01Q 1/50; H01Q 3/24
USPC ......... 343/876, 844, 853; 342/368; 370/277; 455/277.1, 133, 562.1
See application file for complete search history.

(56) References Cited

U.S. PATENT DOCUMENTS 6,005,516 A * 12/1999 Reudink .................. H01Q 3/22
342/375
6,181,276 B1 * 1/2001 Schlekewey .......... H04W 16/28
342/372
(Continued)

FOREIGN PATENT DOCUMENTS

DE 102008047977 * 3/2010
GB 2281007 * 2/1995
(Continued)

OTHER PUBLICATIONS

Lin et al., "QRD-based Antenna Selection for Maximum-Likelihood MIMO Detection", Department of Communication Engineering, National Chiao Tung University, Hsinchu, Taiwan, 300, R.O.C., 978-1-4244-5213-4/09/ $26.00 IEEE Copyright 2009.
(Continued)

*Primary Examiner* — Dameon E Levi
*Assistant Examiner* — Awat Salih
(74) *Attorney, Agent, or Firm* — Myers Wolin LLC

(57) ABSTRACT

The invention relates to a device for receiving signals in a MIMO system comprising:
m signal receiver channels, where m is greater than 1;
an antenna system constituted either by n directive antennae n>m, each antenna being able to receive signals in one of its own angular sectors, the angular sectors of the n antennae essentially not overlapping each other and together thrilling a total angular sector of 360 degrees, or a multi-sector antenna with n angular sectors n>m the n angular sectors essentially not overlapping each other and having a distinct access; and
switching means to associate with each signal receiver channel an antenna from among the n antennae according to a switching schema selected by control means, the switching schema being selected from a plurality of switching schemas of a switching matrix according to a criterion representing the quality of the reception of the signals by said signal receiver channels.

14 Claims, 4 Drawing Sheets

(51) Int. Cl.
*H04B 7/04* (2006.01)
*H04B 7/08* (2006.01)

(56) References Cited

U.S. PATENT DOCUMENTS

| | | | | |
|---|---|---|---|---|
| 6,438,389 | B1* | 8/2002 | Sandhu | H01Q 3/24 |
| | | | | 370/332 |
| 6,757,553 | B1* | 6/2004 | English | H01Q 1/246 |
| | | | | 343/766 |
| 6,771,218 | B1* | 8/2004 | Lalezari | G01S 13/48 |
| | | | | 342/373 |
| 6,907,269 | B2* | 6/2005 | Yamaguchi | H01Q 1/246 |
| | | | | 342/147 |
| 7,953,065 | B2* | 5/2011 | Lysejko | H04W 16/28 |
| | | | | 370/311 |
| 8,509,716 | B2* | 8/2013 | Fitzpatrick | H01Q 1/247 |
| | | | | 333/101 |
| 9,031,519 | B2* | 5/2015 | Nilsson | H01Q 3/24 |
| | | | | 375/219 |
| 2008/0002627 | A1 | 1/2008 | Cha et al. | |
| 2008/0085738 | A1 | 4/2008 | Li et al. | |
| 2010/0117922 | A1 | 5/2010 | Fukuda | |
| 2010/0120466 | A1 | 5/2010 | Li | |
| 2010/0232529 | A1 | 9/2010 | Fettweis et al. | |
| 2012/0020396 | A1* | 1/2012 | Hohne | H01Q 3/267 |
| | | | | 375/224 |

FOREIGN PATENT DOCUMENTS

| | | |
|---|---|---|
| JP | 779476 * | 8/1994 |
| JP | 7-079476 A | 3/1995 |
| JP | 11355305 | 12/1999 |
| JP | 2001127680 | 5/2001 |
| JP | 2010226713 | 10/2010 |
| KR | 10-2008-0072164 A | 8/2008 |
| WO | WO0128036 | 4/2001 |

OTHER PUBLICATIONS

Bui et al, "MSE Based Antenna Selection for MIMO-SDM Systems", The 2009 International Conference on Advanced Technologies for Communications, 978-1-4244-5139-5/09/$26.00, IEEE Copyright 2009, pp. 108-112.

Search Report dated Apr. 12, 2012.

* cited by examiner

DEVICE FOR RECEIVING OR EMITTING/RECEIVING MIMO SIGNALS

This application claims the benefit, under 35 U.S.C. §365 of International Application PCT/FR2011/052894, filed Dec. 7, 2011, which was published in accordance with PCT Article 21(2) on Jun. 14, 2012 in English and which claims the benefit of French patent application No. 1060241, filed Dec. 8, 2010.

TECHNICAL FIELD

The present invention relates to the transmission and the reception of signals in a MIMO (Multiple Input Multiple Output) type wireless multi-antenna transmission system. The present invention applies more specifically to broadband multimedia home networks.

PRIOR ART

The increasing development of digital multimedia devices has given rise to the concept of the home network ensuring the simultaneous distribution of multiple data streams, such as HD (High Definition) video streams, audio streams and computer data streams at any point in the home environment. Such a network, whose structure is dependent on the distribution of rooms within the building (apartment, house with or without a second floor, etc.) in which it is installed, can be deployed using different technologies such as cable, Power Line Carrier (PLC), optical fiber or WiFi type wireless devices complying with the standards 802.11a/b/g or 11n. The latter standard enables the use of MIMO technology which is a multi-antenna technique enabling transmission performances to be improved in terms of bitrate and robustness in environments dominated by interferences.

The MIMO technology consists in transmitting or receiving signals by using a plurality of transmission channels having different characteristics in order to obtain independent signals and thus increase the probability that at least one of the signals is not affected by fading. When the system uses several transmission and/or reception antennae, this is referred to as spatial diversity or antenna diversity. This diversity contributes to improving the MIMO gain by attenuating the interferences due to multi-paths on the one hand, and by increasing the transmission bitrate, the system reliability and the coverage zone on the other hand.

Most MIMO systems use standard 802.11n and a majority of products available on the market rely on 2×2 MIMO type links, that is to say, a system comprising, on the transmission side, 2 transmitters and, on the reception side, 2 receivers. Each transmitter and each receiver is connected to its own omnidirectional antenna. Each transmitter can transmit a single data stream in order to increase the global bitrate or the same stream as the other transmitter in order to increase redundancy and thus improve reception with a nonetheless lower bitrate. It is possible to increase the diversity in transmission or in reception by increasing the number of antennae so as to increase the transmission or reception performances.

One example of a 2×2 MIMO system with a diversity of order 2 in reception is shown by FIG. 2. The system comprises, on the transmission side, two transmission channels 100 and 101 each connected to an omnidirectional antenna, respectively 110 and 111, and on the reception side, two receiver channels 120 and 121 connected to four omnidirectional antennae, 130 to 133, via switching means 140. The switching means are intended to associate with each receiver channel 120 or 121 an antenna from among the 4 antennae 130 to 133 according to a switching schema selected by control means 150. The switching schema is selected from a plurality of switching schemas of a switching matrix according to a criterion representing the quality of the reception of the signals by receiver channels 120 and 121.

If antennae 130 to 133 are also connected by switching means 23 to transmission channels (not shown in FIG. 1), the switching schema selected for the reception can also be used to connect the transmission channels to antennae 130 to 133.

The antennae being omnidirectional, they either transmit or receive signals in all directions and the receiver channels are therefore subjected to many interferences coming from all directions. In transmission, they also create a lot of interferences affecting neighboring devices. This is harmful to the global performance of the MIMO system. Thus, in order to limit the problems due to interferences and improve the quality of the transmitted/received signal, it is also known in the art to use techniques known as "beam forming". A technique of this type is described in U.S. Pat. No. 6,438,389.

One purpose of the invention is to propose a device for receiving or transmitting/receiving signals in a MIMO environment which, in reception, is less affected by interferences.

In the 2×2 MIMO system of FIG. 2, the switching matrix comprises $C^2_4=6$ switching schemas. Each switching schema is tested so as to determine which enables the best reception for signals transmitted by the transmitting antennae 110 and 111. This involves quite a long processing time.

This processing time increases with the MIMO system ranking. If, for example. a 4×4 MIMO system with a degree of diversity of order 2 in reception and using 8 antennae is considered, each receiver channel must be able to choose an antenna from among the 8. If all combinations of 4 antennae from S are considered, $C^4_8=70$ possible switching schemas are obtained. This clearly leads to a processing time incompatible with a dynamic management of the antenna device according to the variations in the environment and more specifically in a home network rich in multi-paths.

Another purpose of the present invention is to propose a multi-antenna device for receiving or transmitting/receiving, enabling the reduction of this processing time.

Moreover, the switching means comprise switching elements leading to losses in the reception of the signals by receiver channels 120 and 121. For example, in the case of the 2×2 MIMO system of FIG. 2, the switching means comprise for example 4 single-pole double-throw switches 141 and 2 single-pole four-throw switches 142 as shown in FIG. 2.

Switches 141 and 142 generate a loss of approximately 0.5 dB and 2 dB respectively at 6 GHz.

Another purpose of the invention is to propose a multi-antenna device for receiving or transmitting/receiving enabling the use of a reduced number of switches in the switching means or the use of switches creating fewer losses.

SUMMARY OF THE INVENTION

According to the invention, the reception device of a MIMO system is equipped with a plurality of directive antennae each covering one of its own angular sectors, the angular sectors of the antennae essentially not overlapping and together forming a total angular sector of 360 degrees.

For this purpose, the present invention relates to a device for receiving signals in a MIMO system comprising:
m signal receiver channels, where m is greater than 1;
an antenna system;
switching means in order to associate with each signal receiver channel an antenna from among n antennae according to a switching schema selected by control means, the switching schema being selected from a plurality of switching schemas of a switching matrix according to a criterion representing the quality of the reception of the signals by said signal receiver channels,
characterized in that the antenna system is constituted by either n directive antennae n>m, each antenna being able to receive signals in one of its own angular sectors, the angular sectors of the n antennae essentially not overlapping each other and together forming a total angular sector of 360 degrees, or by a multi-sector antenna with n angular sectors n>m, the n angular sectors essentially not overlapping each other and each possessing a distinct access.

According to a specific embodiment, the switching matrix comprises p switching schemas, where $$p < \frac{n!}{m!(n-m)!},$$

and the control means control the switching means so as to select one of said switching schemas p according to said quality criterion.

The use of directive antennae each covering its own angular sector or of a multi-sector antenna enables the number of switching schemas in the switching matrix to be reduced and to make this number less than $c_n^m$. Indeed, in a home network context, there is always a main path and therefore a privileged propagation direction. The result is that the probability that opposite sectors contribute to the MIMO multi-path is low. In other words, if a first sector correctly receives MIMO signals, there is a low probability that the opposite sector also correctly receives the MIMO signals. The switching schemes corresponding to these cases can therefore be deleted from the switching matrix, According to a specific embodiment, the switching matrix comprises at least the n switching schemes, each selecting m antennae having consecutive angular sectors. In this embodiment, the switching matrix comprises a limited number of switching schemes, namely m switching schemes instead of $c_n^m$, resulting in a much reduced processing time for the dynamic management of the antennae.

According to another embodiment, the switching matrix also comprises the switching schemes, each selecting m antennae having their angular sectors comprised in a set of m+1 consecutive angular sectors, with at most two antennae from among the m selected antennae having opposite angular sectors. In this embodiment, the switching matrix comprises a larger number of switching schemes, which increases the processing time but enables a response to a larger number of multi-path configurations.

In a variant, the switching matrix comprises, in addition to the n switching schemes each selecting m antennae with consecutive angular sectors, the switching schemes each selecting m antennae having their own angular sectors comprised in a set of m+2 consecutive angular sectors, the switching schemes selecting antennae having opposite angular sectors being excluded from said switching matrix.

The reduction of the number of switching schemes in the switching matrix ($<c_n^m$) enables, in addition to the reduction in the processing time for the dynamic selection of the antennae, the use of a reduced number of switching elements in the switching means and/or the use of switching elements.

According to a preferred embodiment, the control means comprise additional means in order to replace the switching schema selected by said control means by another predefined switching schema of the switching matrix, when the reception quality criterion for at least one of the signal receiver channels is no longer met.

For each switching schema, a replacement switching schema is thus determined in advance when the quality of the reception of the switching schema selected by the control means is no longer good. The replacement can thus be made instantaneously and the processing time is thus reduced to its minimum.

According to a particular embodiment, the angular sectors of the antennae have identical sizes equal to 360/n degrees. The coverage domain of the device is thus divided into equal sectors.

According to a particular embodiment, the n antennae are formed by a multi-sector antenna with n angular sectors, each sector being able to be linked to a receiver channel via said switching means.

The invention is also applicable to the transmission of signals in a device for transmitting and receiving MIMO system signals. In this case, the invention relates to a device for transmitting and receiving signals in a MIMO system comprising:
a reception device such as described previously, and
m signal transmission channels, each signal transmission channel being associated with a signal receiver channel,
wherein switching means are further able to associate with each transmission channel an antenna from among n antennae according to a switching schema selected by the control means, the switching schema being selected from a plurality of switching schemas of a switching matrix according to a criterion representing the quality of the reception of the signals by said associated signal receiver channels.

In this case, it is considered that the transmission channels of the MIMO system are reciprocal. The selection of antennae for the transmission of MIMO signals is then carried out by using the same switching matrix.

BRIEF DESCRIPTION OF THE FIGURES

The invention will be better understood, and other aims, details, characteristics and advantages will appear more clearly over the course of the detailed description which follows in referring to the figures in the appendix, showing in.

DETAILED DESCRIPTION OF EMBODIMENTS

The invention will be described within the scope of multi-antenna reception device of a MIMO system.

The invention is more specifically described using different examples of reception devices, namely a reception device for a 2×2 MIMO system of order 2 in reception, a reception device for a 4×4 MIMO system of order 2 in reception and a reception device for a 3×3 MIMO system of order 2 in reception.

2×2 MIMO System of Order 2 in Reception

Figure 3:
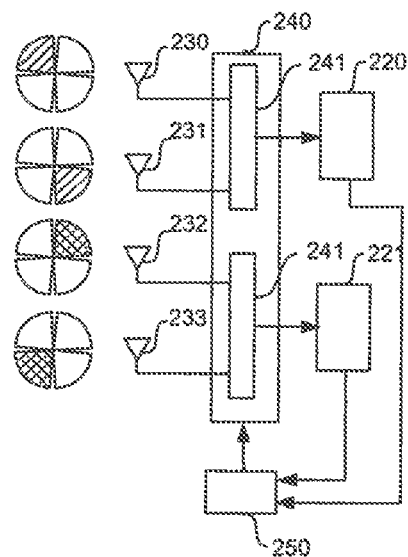
FIG. 3, a diagram of a reception device for a 2×2 MIMO system of order 2 in reception in accordance with the invention.

FIG. 3 shows a reception device for a 2×2 MIMO system of order 2 in reception The reception device comprises two receiver channels 220 and 221, four antennae 230 to 233 and switching means 240 for associating with each receiver channel an antenna from among the four antennae 230 to 233. The switching means are controlled by control means 250 selecting a switching schema from a plurality of switching schemes of a switching matrix according to a criterion representing the quality of the reception of the signals by receiver channels 220 and 221. This criterion is, for example, a measurement of the received strength or RSSI (Received Signal Strength Information) or a measurement of the signal-to-noise ratio.

According to the invention, antennae 230 to 233 are directive antennae, meaning each antenna covers a specific angular sector of around 90°. In the example shown in FIG. 3, antenna 230 covers the 0°-90° sector (clockwise), antenna 231 covers the 180°-270° sector, antenna 232 covers the 90°-180° sector and antenna 233 covers the 270°-360° sector. Directive antennae 230 and 231 cover opposite sectors and are connected by a single-pole double-throw switch 241 to receiver channel 220. Likewise, directive antennae 232 and 233 cover opposite sectors and are connected by a single-pole double-throw switch 241 to receiver channel 221. The angular sectors able to be associated with receiver channel 220 are hatched and the angular sectors able to be associated with reception channel 221 are checkered.

According to a particular embodiment, antennae 230 to 233 are constituted by a single multi-sector antenna having 4 angular sectors of 90° essentially not overlapping and having 4 distinct sector accesses.

The switching matrix advantageously comprises a reduced number of switching schemes enabling a reduced processing time for the dynamic selection of antennae.

Figure 4:
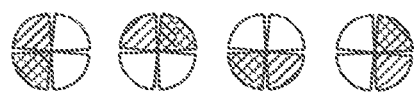
FIG. 4, a diagram showing the switching schemes of a switching matrix which can be used by the device of FIG. 3.

This switching matrix comprises for example the 4 switching schemes shown in FIG. 4, namely:
  the switching schema associating antenna 230 with receiver channel 220 and antenna 233 with receiver channel 221;
  the switching schema associating antenna 230 with receiver channel 220 and antenna 232 with receiver channel 221;
  the switching schema associating antenna 231 with receiver channel 220 and antenna 233 with receiver channel 221;
  the switching schema associating antenna 231 with receiver channel 220 and antenna 232 with receiver channel 221;

Advantageously, the antennae associated with receiver channel 220 and the antennae associated with receiver channel 221 have orthogonal polarizations in order to improve the decorrelation of signals received in adjacent sectors.

In this embodiment, the control means 250 select for receiver channel 220 the antenna enabling the best reception from among the antennae corresponding to the hatched sectors and for receiver channel 221 the best antenna from among the antennae corresponding to the checkered sectors.

In order to achieve this, during a search phase, the control means test successively the 4 switching schemes of the switching matrix and memorize for each one a measurement of the received strength and/or a measurement of the signal-to-noise ratio.

Once the measurements are completed, the control means select the optimal switching schema. Then, the received strength and/or the signal-to-noise ratio are/is measured periodically on each receiver channel, for example every 100 ms. When one of the measurements falls below a predefined threshold value, a search phase is reinitiated.

Figure 1:
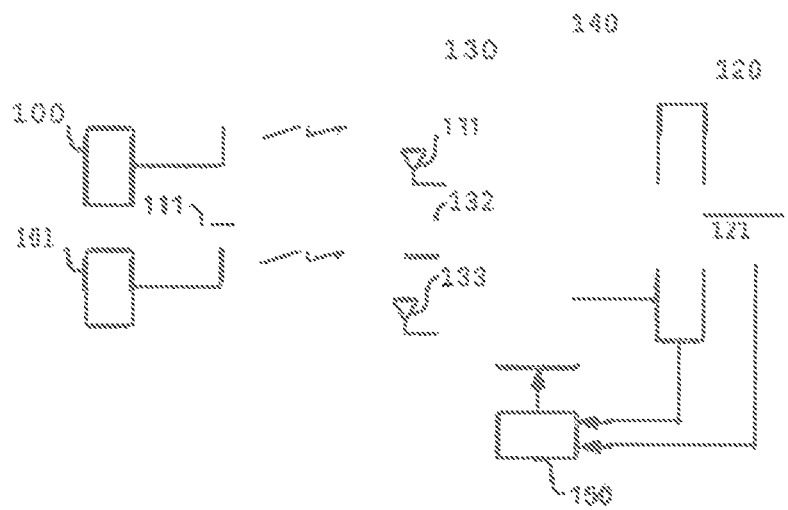
FIG. 1, a diagram showing a 2×2 NINO system with a diversity of order 2 in reception according to prior art.
Figure 2:
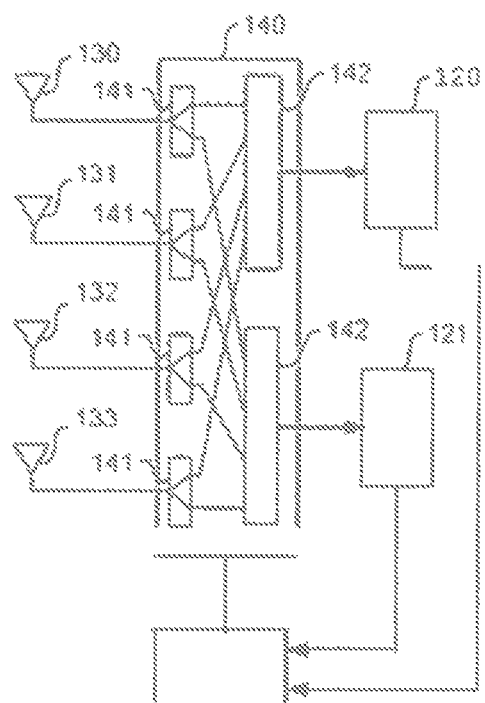
FIG. 2, a diagram of the reception device of the MIMO system of FIG. 1.

In this embodiment, the use of one single-pole double throw switch 241 to connect each receiver channel to an antenna has the advantage of reducing the losses to 0.5 dB, compared with 2.5 dB for the device in FIG. 2.

4×4 MIMO System of Order 2 in Reception

Figure 5:
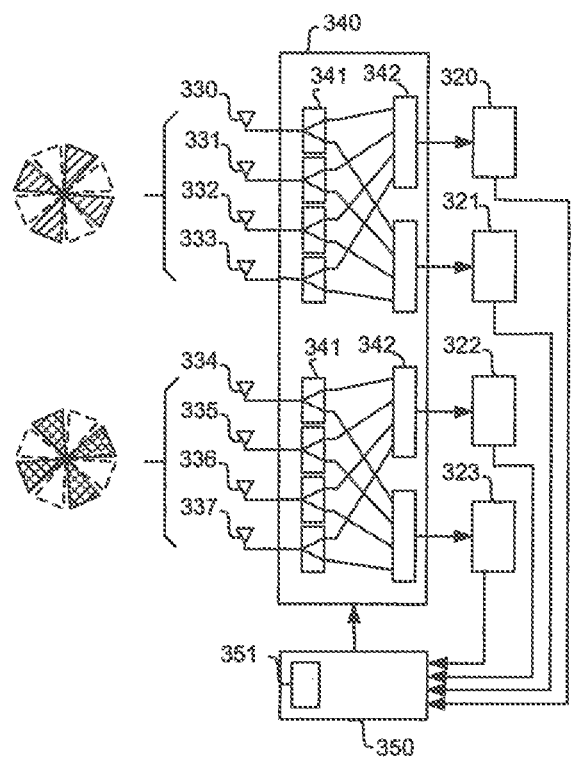
FIG. 5, a diagram of a reception device for a 4×4 MIMO system of order 2 in reception in accordance with the invention.

FIG. 5 shows a reception device for a 4×4 MIMO system of order 2 in reception.

The reception device comprises four receiver channels 320 to 323, eight antennae 330 to 337 and switching means 340 in order to associate with each receiver channel an antenna from among the four antennae 330 to 337. Switching means 340 are controlled by control means 350 which select a switching schema from among a plurality of switching schemes of a switching matrix according to a criterion representing the quality of the reception of the signals by receiver channels 320 and 323.

Antennae 330 to 337 are directive and each cover a specific angular sector of around 45°. In the example shown in FIG. 5, antenna 330 covers the 0°-45° sector, antenna 331 covers the 90°-135° sector, antenna 332 covers the 180°-225° sector and antenna 333 covers the 270°-315° sector, antenna 334 covers the 45°-90° sector, antenna 335 covers the 135°-180° sector, antenna 336 covers the 225°-270° sector and antenna 337 covers the 315°-360° sector.

Receiver channels 320 and 321 are selectively connected to directive antennae 330 to 333 via switching means 340. Similarly, receiver channels 322 and 323 are selectively connected to directive antennae 334 to 337 via switching means 340.

Switching means 340 comprise four single-pole double-throw switches 341 and two single-pole four-throw switches 342 for the connection of antennae 330 to 333 to the receiver channels 320 and 321. They comprise four further single-pole double-throw switches 341 and two further single-pole four-throw switches 342 for the connection of antennae 334 to 337 to the receiver channels 322 and 323.

In FIG. 5, the angular sectors which can be associated with receiver channels 320 and 321 are hatched and the angular sectors that can be associated with receiver channels 322 to 323 are checkered.

According to a particular embodiment, antennae 330 to 337 are constituted by one single multi-sector antenna having 8 angular sectors of 45° essentially not overlapping and having 8 distinct sector accesses, The switching matrix advantageously comprises a reduced number of switching schemes enabling a reduced processing time by the dynamic selection of antennae.

Figure 6:
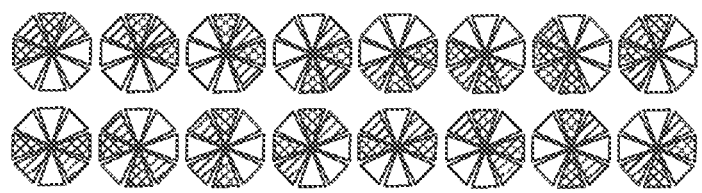
FIG. 6, a diagram showing the switching schemes of a switching matrix which can be used by the device of FIG. 5.

This switching matrix comprises the 16 switching schemes shown in FIG. 6, including 8 switching schemes each selecting 4 reception antennae having consecutive angular sectors and 8 switching schemes each selecting 4 reception antennae having their angular sectors comprised in a set of 5 consecutive angular sectors, with at most two from among the 4 antennae selected having opposite angular sectors.

Advantageously, the antennae associated with receiver channels 320 and 321 and the antennae associated with receiver channels 322 and 323 have orthogonal polarizations in order to improve the decorrelation of signals received in adjacent sectors.

In this embodiment, the control means 350 select for receiver channels 320 and 321 the two best antennae from among the antennae corresponding to the hatched sectors and for receiver channels 322 and 323 the two best antennae from among the antennae corresponding to the checkered sectors.

In order to achieve this, during a search phase, the control means 350 test successively the 16 switching schemas of the switching matrix and memorize for each one a measurement of the received strength and/or a measurement of the signal-to-noise ratio.

Once the measurements are completed, the control means select the optimal switching schema. Then, the received strength and/or the signal-to-noise ratio are/is measured periodically on each receiver channel. When one of the measurements fails below a predefined threshold value, a search phase is reinitiated.

The duration of this initialization phase can nevertheless be long when the switching matrix comprises a large number of switching schemas. It is therefore advantageously provided to define in advance, for each switching schema, a switching schema called a replacement schema which replaces it when the reception quality criterion for at least one of the receiver channels is no longer met, that is to say when the is measurement of the received strength and/or the measurement of the signal-to-noise ratio of one of the receiver channels fall below the predefined threshold values.

Figure 7:
FIGS. 7 and 8, diagrams showing the replacement of the switching schemes of the switching matrix of FIG. 6 by other switching schemes of the matrix.
Figure 8:

This replacement operation is shown by FIGS. 7 and 8. FIG. 7 shows the case where the quality criterion for one of the receiver channels is no longer met. The angular sector of the antenna associated with this receiver channel is represented in black in the figure. In this embodiment, the current switching schema is replaced by a predefined replacement switching schema of the switching matrix which does not use the sub-optimal receiver channel. This replacement operation is performed by means of a look-up table 351 (LUT) controlled by a replacement algorithm. This LUT is stored in the control means. In the example of FIG. 8, the current switching schema is replaced by the switching schema in which the sector in black is replaced by its opposite dual.

FIG. 8 shows the case where the quality criterion for two receiver channels is no longer met. In this case, the current switching schema is replaced by a predefined replacement switching schema of the switching matrix which does not use the defective sectors (sectors in black).

It should be noted that the use of one single-pole double-throw switch 341 and one single-pole four-throw switch 342 to connect each receiver channel to an antenna enables losses to be limited to 2.5 dB. In the prior art, a single-pole eight-throw switch is typically used for which losses are much higher.

3×3 MIMO System of Order 2 in Reception

Figure 9:
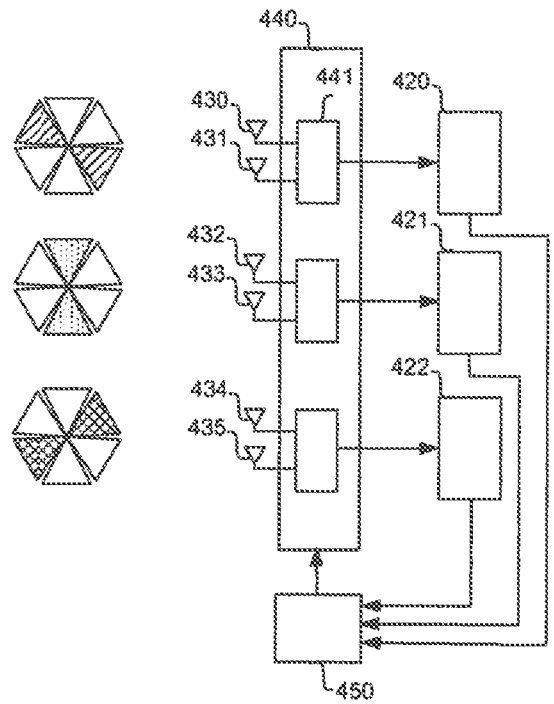
FIG. 9, a diagram of a reception device for a 3×3 MIMO system of order 2 in reception in accordance with the invention.

FIG. 9 shows a reception device for a 3×3 MIMO system of order 2 in reception

The reception device comprises three receiver channels 420, 421 and 422, six reception antennae, 430 to 435, and switching means 440 for associating with each receiver channel an antenna from among the six antennae 430 to 435. The switching means are controlled by control means 450 selecting a switching means from among a plurality of switching means of a switching matrix according to a criterion representing the quality of the reception of the signals by receiver channels 420 and 422.

Antennae 430 to 233 are directive antennae each covering a particular angular sector of around 60°. In the example shown by FIG. 9, antenna 430 covers the 0°-60° sector, antenna 431 covers the 180°-240° sector, antenna 432 covers the 60°-120° sector, antenna 433 covers the 240°-300° sector, antenna 434 covers the 120°-180° sector and antenna 435 covers the 300°-360° sector. In the figure, the sectors of antennae 430 and 431 are hatched and represent the sectors able to be associated with receiver channel 420. The sectors of antennae 432 and 433 are represented by points and represent the sectors able to be associated with receiver channel 421. The sectors of antennae 434 and 435 are checkered and represent the sectors able to be associated with receiver channel 422.

The 6 antennae 430 to 435 can constitute one and the same multi-sector antenna having 6 angular sectors of 60° essentially not overlapping and 6 distinct sector accesses.

The switching means comprise three single-pole double-throw switches 441, each selectively connecting two antennae to its own receiver channel.

Figure 10:
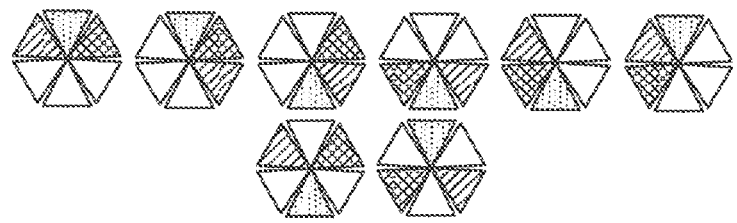
FIG. 10, a diagram showing the switching schemes of a switching matrix which can be used by the device of FIG. 9.

The switching matrix advantageously comprises the 8 switching schemas shown in FIG. 10, including 6 switching schemas each selecting 3 antennae having consecutive angular sectors and 2 switching schemes each selecting 3 antennae having non-contiguous angular sectors.

In this embodiment, control means 450 select, for the 3 receiver channels the "best" antenna from among the antennae corresponding to the hatched sectors, the "best" antenna from among the antennae corresponding to the sectors represented by points and the "best" antenna from among the antennae corresponding to the checkered sectors.

As for the other systems, during a search phase, the control means test successively the 8 switching schemes of the switching matrix and memorize for each one a measurement of received strength and/or a measurement of the signal-to-noise ratio. Once the measurements are completed, the control means select the optimal switching schema. Then, the received strength and/or the signal-to-noise ratio are/is measured periodically on each receiver channel. When one of these measurements falls below a predefined threshold value, the switching schema is replaced by a predefined replacement switching schema.

Figure 11:
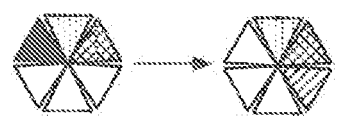
FIG. 11, a diagram showing the replacement of a switching schema of the switching matrix of FIG. 10 by another switching schema of the matrix.

This replacement operation is shown by FIG. 11 This figure shows the case where the quality criterion for one of the receiver channels is no longer met. The angular sector of the antenna associated with this defective receiver channel is represented in black in the figure. In the example of FIG. 11, the current switching schema is replaced by the switching schema in which the sector in black is replaced by its opposite dual It should be noted that the use of one single-pole double-throw switch 441 to connect each receiver channel to an antenna enables losses to be limited to 0.5 dB. In the prior art, a single-pole six-throw switch is typically used for which losses are much higher.

The invention is also applicable to the transmission of signals in a device for transmitting and receiving MIMO system signals. In this case, the device comprises, in addition to the means described previously, signal transmission channels, each signal transmission channel being associated with a signal receiver channel The switching means are further able to associate with each of the channels or the receiver channels an antenna from among the antennae of the device according to a switching schema selected by the control means. In this case, it is considered that the transmission channels of the MIMO system are reciprocal.

The switching schema selected to connect the transmission channels to the antennae and to transmit MIMO signals is the same as that used to receive the MIMO signals.

The invention is more specifically applicable within the scope of deployment of broadband multimedia home networks. The switching matrix topologies proposed here enable the implementation of directive antennae solutions associated with MIMO type multi-antenna transmission devices. They allow for a directivity gain while limiting the perturbation risk linked to the interferences in a home environment that is rich in multi-paths. The invention helps to discretize space and, as a result, adds a degree of spatial diversity via the sectorization of antennae. This concept associates a simplified architecture and considerably alleviates the process of switching schema selection. The reduction in processing time thus enables an effective dynamic control of the antennae in order to combat the harmful effects of multi-paths and interfering elements more efficiently, and to increase the system performances noticeably in terms of range and bitrate.

Although the invention has been described in relation to different particular embodiments, it is obvious that it is in no way restricted and that it comprises all the technical equivalents of the means described together with their combinations if the latter fall within the scope of the invention.

The invention claimed is:

1. A device for receiving signals in a MIMO system comprising:
    m signal receiver channels, where m is greater than 1;
    an antenna system comprising at least one of an n directive antennae n >m, each antenna being configured to receive signals in an angular sector of each antenna, the angular sector of each antennae not overlapping with another antennae and together forming a total angular sector of 360 degrees, or a multi-sector antenna with n angular sectors n >m, the n angular sectors not overlapping with each other and having a distinct access; and
    switches configured to associate with each signal receiver channel, an antenna from among the n antennae according to a switching schema selected by a controller, wherein the switching schema is selected from a plurality of p switching schemas, where p <n!/m!(n-m)!, according to a criteria representing a quality of reception of the signals by said signal receiver channels, wherein each of the plurality of switching schema select m antennae having their angular sectors comprised in a set of m+1 consecutive angular sectors, with at most two antennae from among the m antennae selected having opposite angular sectors.

2. The device according to claim 1, wherein a switching matrix comprises at least the n switching schemas each selecting m antennae having consecutive angular sectors.

3. The device according to claim 2, wherein the switching matrix further comprises the switching schemas each selecting m antennae having their angular sectors comprised in a set of m+2 consecutive angular sectors, the switching schemas selecting antennae having opposite angular sectors being excluded from said switching matrix.

4. The device according to claim 1, wherein the controller is further configured to replace the switching schema selected by said controller by another predefined switching schema of a switching matrix, when a reception quality criterion for at least one of the signal receiver channels is no longer met.

5. The device according to claim 1 wherein the angular sectors have identical sizes equal to 360 /n degrees.

6. The device according to claim 1 wherein n antennae are formed by a multi-sector antenna with n angular sectors, each sector being able to be linked to a receiver channel via said switch.

7. A device for transmitting and receiving signals in a MIMO system comprising:
    a reception device,
    m signal transmission channels, each signal transmission channel being associated with a signal receiver channel, and switches
    wherein the switches are configured to associate with each transmission channel one antenna from among the n antennae according to a switching schema selected by controller, the switching schema being selected from a plurality of switching schemas of a switching matrix according to a criterion representing a quality of a reception of the signals by said associated signal receiver channels, wherein each of the plurality of switching schema select m antennae having their angular sectors comprised in a set of m+1 consecutive angular sectors, with at most two antennae from among the m antennae selected having opposite angular sectors.

8. A method for receiving signals in a MIMO system, the method comprising:
    receiving, by each antenna in an antenna system, signals in one angular sector of each antenna, the angular sector of each antennae not overlapping with another antenna and together forming a total angular sector of 360 degrees, the antenna system comprising at least one of an n directive antennae n >m such that m represents a number of signal receiver channels and m is greater than 1 or a multi-sector antenna with n angular sectors n >m in which the n angular sectors do not overlap and have a distinct access; and
    associating, using switches, with each signal receiver channel, an antenna from among the n antennae according to a switching schema selected by a controller, wherein the switching schema is selected from a plurality of p switching schemas, where p <n!/m!(n-m)!, according to a criteria representing a quality of reception of the signals by said signal receiver channels, wherein each of the plurality of switching schema select m antennae having their angular sectors comprised in a set of m+1 consecutive angular sectors, with at most two antennae from among the m antennae selected having opposite angular sectors.

9. The method according to claim 8, wherein a switching matrix comprises at least the n switching schemas each selecting m antennae having consecutive angular sectors.

10. The method according to claim 9, further comprising selecting m antennae, by each switching schema, having their angular sectors comprised in a set of m+2 consecutive angular sectors, the switching schemas selecting antennae having opposite angular sectors being excluded from said switching matrix.

11. The method according to claim 8, further comprising replacing, using the controller, the switching schema selected by said controller by another predefined switching schema of a switching matrix, when a reception quality criterion for at least one of the signal receiver channels is no longer met.

12. The method according to claim 8, wherein the angular sectors have identical sizes equal to 360/n degrees.

13. The method according to claim 8, further comprising forming, by a multisector antenna, n antennae with n angular sectors, each sector being able to be linked to a receiver channel via said switch.

14. A method for transmitting and receiving signals in a MIMO system, the method comprising:

associating, using switches of m signal transmission channels, with each transmission channel one antenna from among n antennae according to a switching schema selected by a controller, the switching schema being selected from a plurality of switching schemas of a switching matrix according to a criterion representing a quality of a reception of the signals by said associated signal receiver channels, each of the m signal transmission channels being associated with a signal receiver channel, wherein each of the plurality of switching schema select m antennae having their angular sectors comprised in a set of m+1 consecutive angular sectors, with at most two antennae from among the m antennae selected having opposite angular sectors.

* * * * *